United States Patent

Stieb et al.

[11] Patent Number: 5,956,450
[45] Date of Patent: Sep. 21, 1999

[54] DEVICE FOR STORING A NUMBER OF CASSETTES

[75] Inventors: Werner Stieb, Stadthagen; Hans-Holger Freckmann, Langenhagen; Zbigniew Wielgolaski; Franz Grajewski, both of Stadthagen, all of Germany

[73] Assignee: Alcatel, France

[21] Appl. No.: 09/032,469

[22] Filed: Feb. 26, 1998

[30] Foreign Application Priority Data

Mar. 12, 1997 [DE] Germany ............................ 297 04 505

[51] Int. Cl.⁶ ........................................................ G02B 6/00
[52] U.S. Cl. ............................................. 385/135; 385/134
[58] Field of Search .................................. 385/134, 135, 385/136, 137, 138, 139

[56] References Cited

U.S. PATENT DOCUMENTS

| | | | |
|---|---|---|---|
| 5,278,933 | 1/1994 | Hunsinger et al. | 385/134 X |
| 5,339,379 | 8/1994 | Kutsch et al. | 385/134 X |
| 5,544,273 | 8/1996 | Harrison | 385/135 |
| 5,570,450 | 10/1996 | Fernandez et al. | 385/134 X |
| 5,778,131 | 7/1998 | Llewellyn et al. | 385/135 |
| 5,887,106 | 3/1999 | Cheeseman et al. | 385/135 |

FOREIGN PATENT DOCUMENTS 44 05 666 A1 of 0000 Germany .

Primary Examiner—Phan T. H. Palmer
Attorney, Agent, or Firm—Ware, Fressola, Van der Sluys & Adolphson LLP

[57] ABSTRACT

In a device for holding a number of cassettes of which at least one stores a length of optical fibers, at least one holder is provided for the cassettes wherein the cassettes are arranged horizontally and in parallel. Each cassette (4) can be pulled out individually from lateral guides (5) in the holder (3). Separated from the holder (3), a guide block (7) with a number of superimposed attachment points (13) for the optical fibers or conductors is attached to it. The inlet and the outlet (14) for the optical fibers or the conductors are arranged on the side of the cassette (4) which faces the guide block (7).

11 Claims, 1 Drawing Sheet

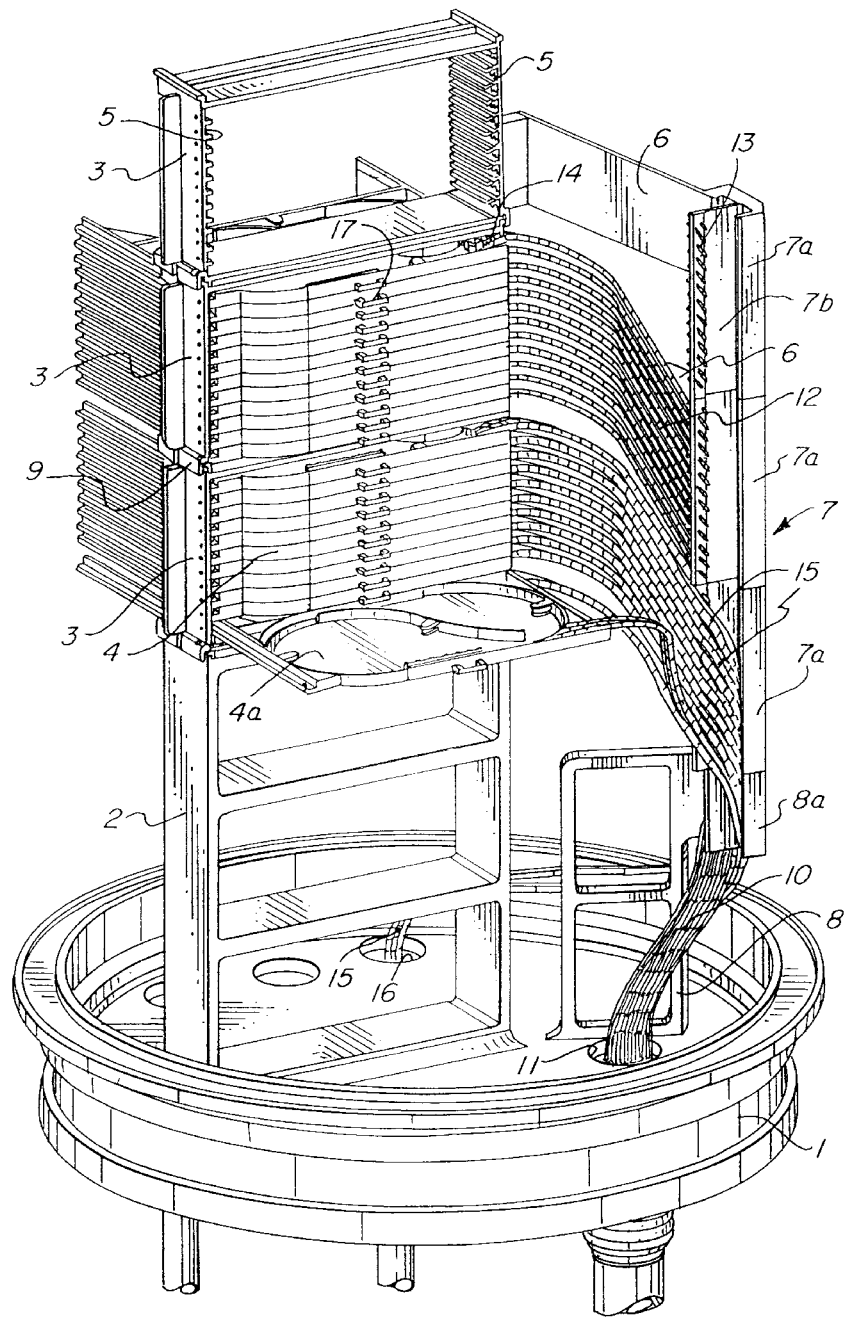

DEVICE FOR STORING A NUMBER OF CASSETTES

BACKGROUND OF THE INVENTION

1. Technical Field

The invention concerns a device for storing a number of cassettes.

2. Description of the Prior Art

A universal connecting unit for optical fibers is known from DE-A-44 05 666. This connecting unit comprises a hooded collar with a socket head and a hood. The socket head contains several feed-throughs in which a main cable can be inserted into the socket and a branch cable can be taken out. An attachment shackle is secured to the socket head and has a rear wall from which a number of cassettes can swivel outward. The cassettes have an oval shape and contain individual fiber splices, bundled conductor splices, couplers, adapters for branching bundled conductors to individual fibers, or slack lengths of the optical fibers. The special advantage of the connecting unit is that it is able to hold a different number of cassettes of different heights. Another advantage is the good accessibility to the individual splices which are allocated to a subscriber and are always stored in a separate cassette.

This arrangement has the disadvantage that the main cable is inserted into the socket, which entails problems with the sealing of the inlet area in the socket head. Another disadvantage is that only oval cassettes can be used.

From the older German patent application 197 05 648.2 by the applicant, a socket for optical fibers with a number of cassettes is known, where each one is individually accessible and can store a slack length of an optical fiber. The socket is premanufactured at the factory so that the ends of the optical fibers can be connected to the optical fibers to be branched out from an optical cable.

SUMMARY OF THE INVENTION

The object of the present invention is to provide a so-called organizer for sockets which makes a special access to the individual cassettes possible, without impairing the other cassettes. Beyond that it must guarantee that the optical fibers are conducted at all times in a way to prevent unallowable bends in the optical fibers.

The significant advantages of the invention are that each cassette is individually accessible without impairing any other cassettes. The guide block with the attachment points ensures that the optical fibers or conductors are not bent below the permissible bending radius in both the inserted and the pulled-out condition. The slack lengths which are stored in the cassettes can be pulled out in a simple manner to perform the necessary work.

The invention will be fully understood when reference is made to the following detailed description taken in conjunction with the accompanying drawing.

BRIEF DESCRIPTION OF THE DRAWING

The FIGURE is a perspective view of device for storing cassettes in accordance with the invention.

DETAILED DESCRIPTION OF THE INVENTION

The socket head 1 of a hooded collar has a first carrier 2 on which a holder 3 is fastened in a detachable manner, and a number of cassettes 4 is inserted therein. To that end, each holder 3 has a number of guides 5 on both sides. The figure illustrates a cassette 4a in the pulled-out condition. The cassettes 4 or 4a store a not illustrated slack length of one or two optical fibers or conductors.

An element 7a of a guide block 7 is attached to each holder 3 via an arm 6. The holder 3, arm 6 and element 7a form a unit.

The guide block 7 is divided by a partition wall 7b into a front guide and a rear guide. The rear guide is intended for the incoming optical fibers or conductors 12 and the rear guide for the outgoing optical fibers or conductors 15.

In addition to the first carrier 2, a second carrier 8, which receives a base 8a, is attached to the socket head 1. The lowermost element 7a rests on this base 8a. The lowermost holder 3 rests on the first carrier 2.

Other units of holder 3, arm 6 and element 7a are stored on the units located under them. The holders 3 are connected in a detachable manner to the first carrier 2, and to each other by means of insertable clamping elements 9, or by insertion for example.

The cassettes 4 can be pulled out of the holder 3 in drawer fashion. In their final position, they are not retained in the holder 3 in the illustrated manner. A bundle of optical fibers or conductors 10 passes through a circular opening 11 in the socket head 1. The individual optical fibers or conductors 12 are attached to the guide block 7 by clipping them to corresponding holders 13 for example. Further on the optical fibers or conductors 12 are inserted into the cassettes 4, where several windings are stored and come out again. The inlet and the outlet 14 for the optical fibers or conductors 12 are arranged on the side of a cassette 4, namely the side which faces the guide block 7.

The distance between two holders 13 is equal to the raster spacing between the cassettes. The result is that the optical fibers or conductors 12 run parallel to each other when the cassettes 4 are in the inserted position.

Every cassette 4 has a handle 17 on the front to simplify pulling the cassettes 4 out of the holder 3.

The outgoing optical fibers or conductors 15 are of a subscriber cable which pass through the socket head 1 via another opening 16.

The bundle 10 either contains hollow conductors, i.e. plastic tubes in which one or two optical fibers with slack length are stored, or solid conductors, i.e. optical fibers which have another plastic layer over their coating. In the case of hollow conductors, only optical fibers are stored in the cassettes. When solid conductors are used, the slack length in the cassettes is a length of solid conductor.

The preferred embodiment described above admirably achieves the objects of the invention. However, it will be appreciated that departures can be made by those skilled in the art without departing from the spirit and scope of the invention which is limited only by the following claims.

What is claimed is:

1. A device for holding a plurality of cassettes of which at least one stores a length of optical fibers or conductors, comprising:

(a) a holder for the cassettes wherein the cassettes are arranged horizontally with inlets and outlets in the cassettes for the optical fibers or conductors arranged with respect to the holder;

(b) lateral guides in the holder from which each cassette can be individually pulled out; and (c) a guide block fastened to the holder and facing the inlets and outlets in the cassettes, the guide block having a number of superimposed attachment points for the optical fibers or conductors.

2. A device as claimed in claim 1, further comprising several further holders stacked in modular form above the holder.

3. A device as claimed in claim 2, wherein the holder and the further holders are detachably interconnected with each other.

4. A device as claimed in claim 2, wherein each holder forms a unit with a part of the guide block.

5. A device as claimed in claim 1, wherein each cassette has a handle on one side.

6. A device as claimed in claim 1, wherein the cassettes can be pulled out of the holder to a final position and can be secured in the final position.

7. A device as claimed in claim 1, further including clip-like elements for retaining the optical fibers or conductors in the attachment points.

8. A device as claimed in claim 1, further including a carrier attached to the holder and the carrier is attached to a socket head of a hooded collar.

9. A device as claimed in claim 1, wherein the guide block is assembled from several parts.

10. A device as claimed in claim 1, wherein the attachment points are spaced on the guide block a same distance as spacing between the inlets and outlets of adjacent cassettes, so that the optical fibers or conductors run parallel to each other between the attachment points and the inlets and outlets of the cassettes.

11. A device as claimed in claim 1, further including a socket head of a hooded collar, the socket head having an inlet opening defined therein for the optical fibers or conductors, a lower end of the guide block terminates generally above the inlet opening.

* * * * *